United States Patent [19]

Moriguchi et al.

[11] Patent Number: 4,701,811
[45] Date of Patent: Oct. 20, 1987

[54] TONE REPRODUCTION METHOD AND APPARATUS

[75] Inventors: Haruhiko Moriguchi; Toshiharu Inui; Yoshihiro Ishida, all of Kanagawa, Japan

[73] Assignee: Fuji Xerox Co., Ltd., Tokyo, Japan

[21] Appl. No.: 733,770

[22] Filed: May 14, 1985

[30] Foreign Application Priority Data

May 15, 1984 [JP] Japan .................................. 59-95672

[51] Int. Cl.⁴ .......................... H04N 1/30; H04N 1/40
[52] U.S. Cl. ..................................... 358/298; 358/296; 358/283
[58] Field of Search ............... 358/298, 296, 280, 283, 358/278; 346/76 PH

[56] References Cited

U.S. PATENT DOCUMENTS

| 4,389,712 | 6/1983 | Frattarola et al. | 358/298 X |
| 4,412,226 | 10/1983 | Yoshida | 358/298 X |
| 4,491,875 | 1/1985 | Kawamura | 358/298 |

*Primary Examiner*—E. A. Goldberg
*Assistant Examiner*—Linda M. Peco
*Attorney, Agent, or Firm*—Finnegan, Henderson, Farabow, Garrett and Dunner

[57] ABSTRACT

In a half-tone recording method and apparatus, half-tone expressing units, each consisting of several recording picture elements, express gradations of density in a document. The recording picture elements in the units are assigned various half-tone levels with the half tone level of at least one of the recording picture elements both increasing and decreasing as the gradation of the half-tone expressing unit increases.

3 Claims, 17 Drawing Figures

| a | b | c |
|---|---|---|
| d | e | f |
| g | h | i |

TONE REPRODUCTION METHOD AND APPARATUS

BACKGROUND OF THE INVENTION

This invention relates to a method of and apparatus for expressing tone image by digital recording.

In transmitting an original document, many facsimile systems divide the picture data on the document into picture elements and then form an analog picture signal indicating the densities of the picture elements. The facsimile systems then binary-encode the analog picture signal using a predetermined threshold level and thereby create a digital picture signal identifying "white" and "black" picture elements of the original document. The facsimile systems contain a device that records picture data according to the picture elements (printing dots) represented in the digital picture signal. Because this method records picture elements according to binary-coded picture signals, it is impossible to express half-tones.

To overcome this limitation, several methods of reproducing picture signal levels using half-tones have been proposed. Examples of such methods are the dither method, the area gradation method, and the 3L method. In each of these methods, several recording picture elements are grouped to form a unit for expressing a half-tone. The units, referred to as "half-tone expressing units," are closely arranged on a recording surface. The half-tone data from those units determines the printing of the recording picture elements.

Figure 1:
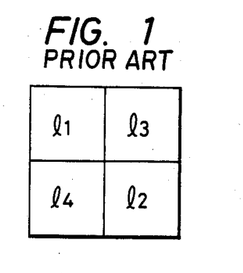
FIG. 1 is a diagram of a half-tone expressing unit consisting of four recording picture elements each with different threshold levels.

FIG. 1 shows the simplest half-tone expressing unit containing recording picture elements arranged in a 2×2 matrix. As FIG. 1 shows, the different recording picture elements in the units each have different threshold levels $1_1$ through $1_4$ which are used to determine the elements' binary state, "0" or "1", for a white or black picture element, respectively. For purposes of explaining FIG. 1, threshold level $1_1$ represents the lowest density, threshold level $1_2$ is higher than threshold level $1_1$, threshold level $1_3$ is higher than threshold level $1_2$, and threshold level $1_4$ represents the highest density.

Figure 2:
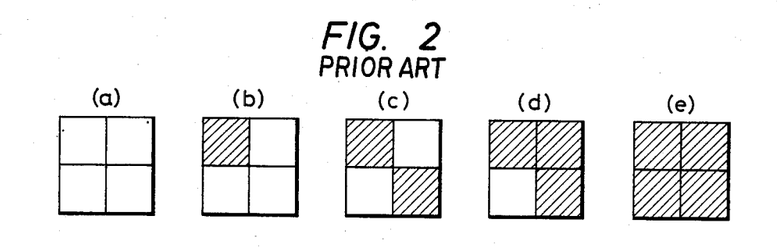

A picture signal for a white region in an original document has the lowest density and the corresponding signal level is lower than threshold levels $1_1$ through $1_4$. The half-tone expressing unit for that region thus contains four recording picture elements which are white elements, i.e., non-printing dots, as shown in FIG. 2a. As the density increases, the half-tone level picture signal exceeds threshold level $1_1$ causing one recording picture element in the half-tone expressing unit to be represented by a black picture element, e.g., a printing dot as shown in FIG. 2b. Similarly, as the density expressed by the half-tone expressing unit increases still further, the picture signal level exceeds threshold levels $1_2$, $1_3$ and $1_4$ as shown in FIGS. 2(c)–(e). A 2×2 matrix of recording picture elements can thus express five gradations from white to black.

Figure 3:
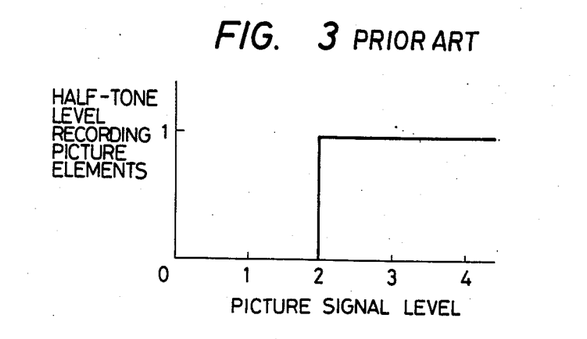
FIG. 3 is a graph of the relationship between recording picture element half-tone levels and picture signal levels in the gradations in FIG. 2.

FIG. 3 is a graph showing the relationship of picture signal levels and the half-tone levels for threshold level $1_2$. As shown in FIG. 3, when the picture signal level reaches the threshold level, it changes from "0" to "1."

While a binary-encoding of picture signal levels can express five half-tone gradations, ternary-encoding can express even more gradations.

Figure 4:
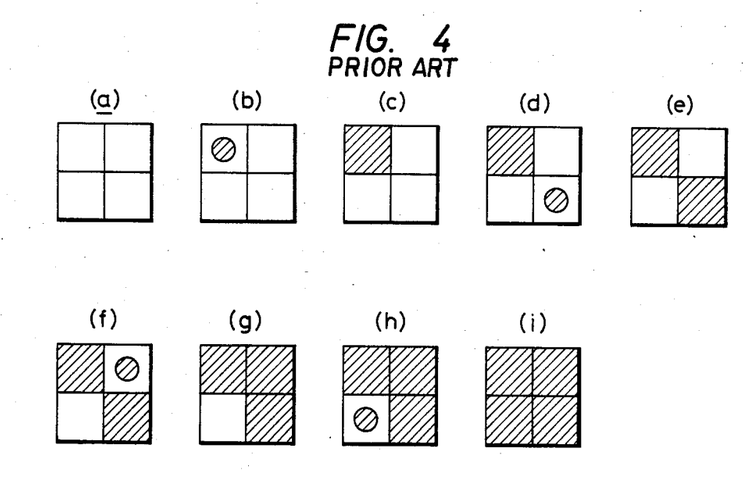

FIG. 4 shows examples of a half-tone expressing unit formed according to a conventional ternary half-tone expression method. Each of the four recording elements in a half-tone expressing unit has two threshold levels. An element is expressed as a white picture element, referred to as a non-printing dot, when its picture signal level is below the lower of the two threshold levels. An element is expressed as a black picture element, referred to as "a full dot," when its picture signal level is above the higher of the two threshold levels. When the element's picture signal level is between the two threshold levels, it is expressed as a picture element whose black area is smaller than that of the full dot and is referred to as "a half dot."

Figure 5:
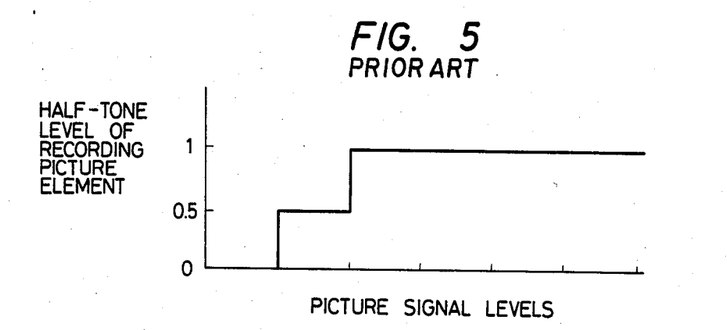
FIG. 5 is a graph of the relationship between recording picture element half-tone levels and picture signal levels in conventional ternary-encoding systems.

FIG. 5 shows the variations in half-tone levels with picture signal levels for the recording picture element having threshold level $1_1$ in the half-tone expressing unit shown in FIG. 1. Conventional devices are limited by the principle that, as the picture signal density level increases, the half-tone level of each recording picture element must also increase in a stepwise manner such as that shown in FIGS. 4 and 5. These conventional devices can therefore express only nine different gradations as shown in FIGS. 4(a)–(i) and they do not permit use of the six gradations shown in FIGS. 6(a)–(f). Devices employing ternary-encoding and having four recording picture elements in each half-tone expressing unit should be able to express fifteen (15) different gradations, i.e., the nine of FIGS. 4(a)–(i) and the six of FIGS. 6(a)–(f). Conventional devices, however, have not been able to use this full capability.

SUMMARY OF THE INVENTION

In view of the foregoing, an object of this invention is to provide a half-tone recording method in which recording picture elements forming a half-tone expressing unit can express half-tones other than white and black and the number of gradations which can be expressed by the half-tone expressing unit can be changed without changing the number of recording picture elements forming the unit.

The foregoing object and other objects of the invention have been achieved by a method of recording half-tone densities of a picture from a picture signal representing that picture comprising the steps of: assigning different picture elements to different portions of the picture signal, each picture element being capable of assuming one of a first number of half-tone values; grouping second numbers of the picture elements into half-tone expressing units; determining which of a third number of half-tone gradations corresponds to each expressing unit by analyzing the picture signal, each gradation corresponding to a different range of half-tone densities of the picture and being represented by a unique combination of picture element half-tone values such that the half-tone values of at least one of the picture elements both increases and decreases with an increase in gradation; and recording, for each determined gradation, the half-tone values for the picture elements in the corresponding half-tone expressing unit.

The nature, principle and utility of the invention will become more apparent from the following detailed description and the appended claims when read in conjunction with the accompanying drawings.

BRIEF DESCRIPTION OF THE DRAWINGS

FIGS. 2(a)-(e) show the five gradations that the half-tone expressing unit in FIG. 1 can express using binary-encoding;

FIGS. 4(a)-(i) show the different gradations that half-tone expressing units in conventional ternary-encoding systems can express;

FIGS. 6(a)-(b) show gradations which half-tone expressing units in conventional ternary-encoding systems cannot express;

FIGS. 8(a)-(o) show the fifteen (15) different gradations expressed by half-tone expressing units in a first embodiment of this invention.

FIGS. 9(a) and (b) are plan views showing the sizes of a full dot and a half dot, respectively;

FIGS. 10(a)-(d) are graphs of the relationships between recording picture element half-tone levels and original densities and original density decision threshold values according to a first embodiment of this invention;

FIGS. 11 and 11(a)-(d) are graphs of the relationships between recording densities and original densities according to a first embodiment of this invention;

FIGS. 16(a)-(i) are graphs of the relationships between original densities and recording picture element half-tone levels according to a second embodiment of this invention.

DETAILED DESCRIPTION OF THE INVENTION

First Embodiment

Figures 6, 7, 9:
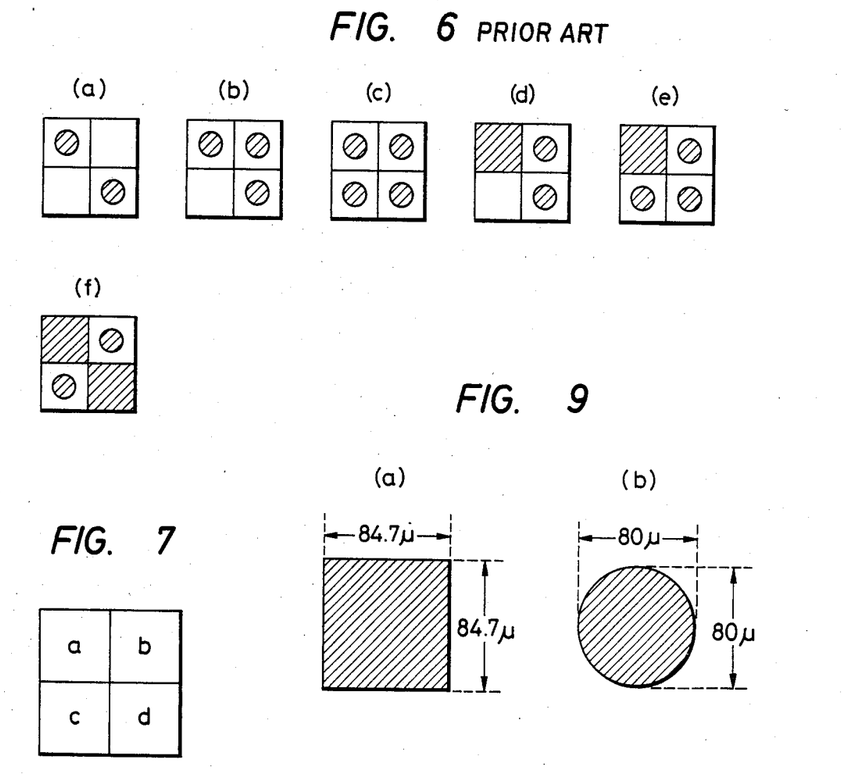
FIG. 7 is a diagram of the arrangement of recording picture elements in a half-tone expressing unit used in the present invention.

One example of a half-tone recording method and apparatus according to this invention employs a half-tone expressing unit shown in FIG. 7. That unit includes four recording elements a, b, c, and d arranged in a 2×2 matrix form. The half-tone expressing unit in FIG. 7 can express the fifteen (15) different gradations shown in FIGS. 8(a)-(o). Preferably, a full dot recorded by a recording device is an 84.7 μm×84.7 μm square, as shown in FIG. 9(a), and a half dot (partial dot) is a circle with an 80 μm diameter as shown in FIG. 9(b). Thus, the area of a half or partial dot may be approximately 5,026 um² and the area of a full dot may be approximately 7,174 um². The total area of each recording picture element is the same as that of the full dot.

Figure 8:
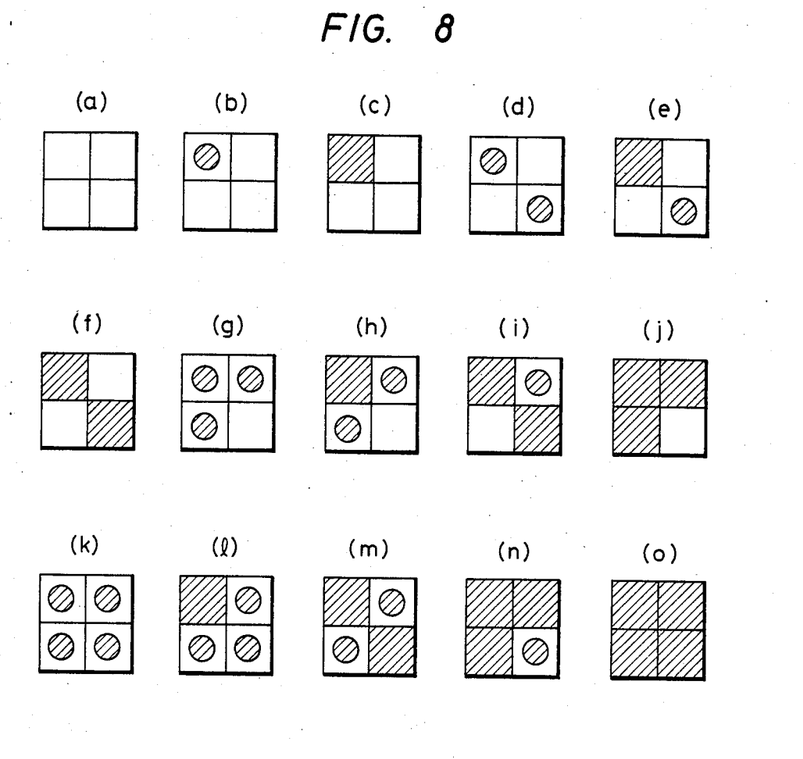
Figure 10:
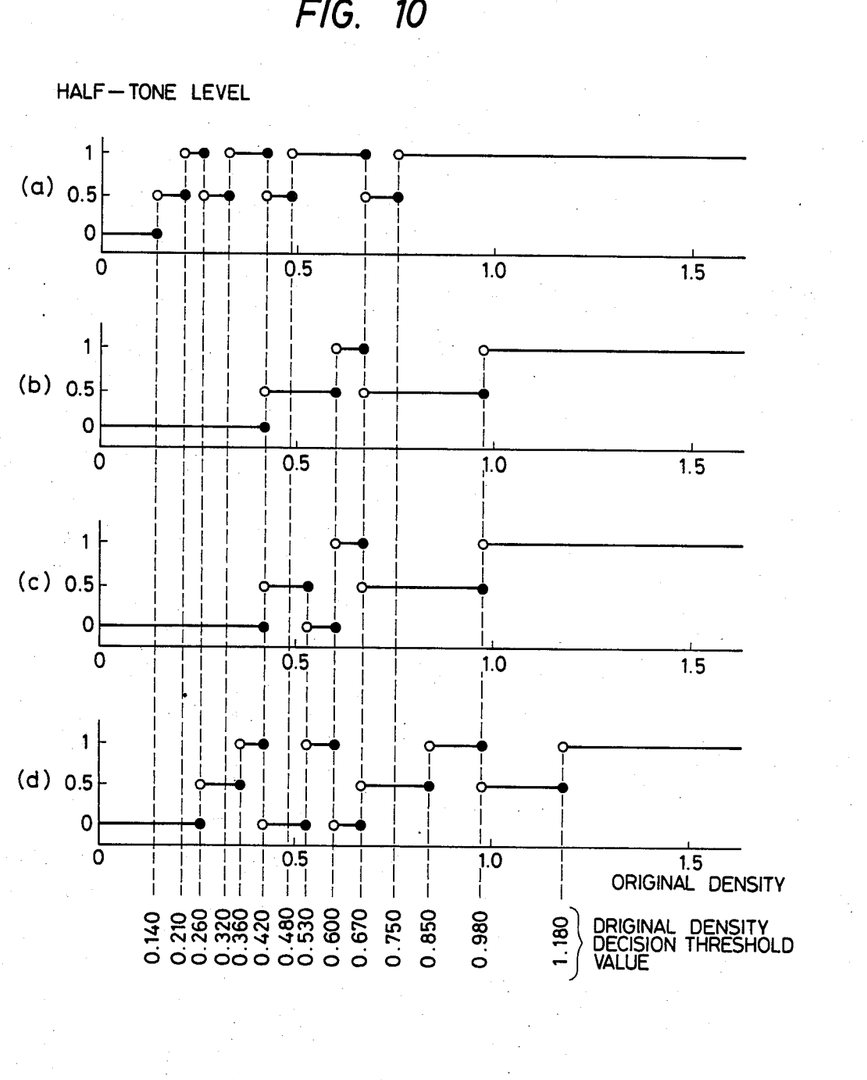

The graph in FIGS. 10(a)-(d) indicates the relationships between original densities and half-tone levels of the recording picture elements a, b, c, and d, respectively, which allows the full fifteen (15) half-tone expressing units shown in FIG. 8. For example, FIG. 8(a) shows a half-tone expressing unit in which recording picture elements a, b, c, and d are all 0. FIGS. 10(a)-(d) show the original densities corresponding to the expressing unit in this state.

In FIG. 8(b), recording elements (b)-(d) are zero and recording picture element a is a half dot which has a half-tone level of 0.5. As FIG. 10(a) indicates, the change in the state of the expressing unit from that shown in FIG. 8(a) to that shown in FIG. 8(b) occurs when the original density exceeds 0.140. Thus, the first original density decision threshold value is 0.140.

In the half-tone expressing unit shown in FIG. 8(c), the recording picture element changes to a full dot with a half-tone level of 1.0. As FIG. 10(a) shows, this transition occurs when the original density is larger than 0.210. In the half-tone expressing unit shown in FIG. 8(d), both recording picture elements a and d are half dots but recording picture elements b and c remain at zero. FIGS. 10(a)-(d) indicate that this state occurs when the original density is larger than 0.260. In a similar manner, the half-tone expressing units shown in FIGS. 8(e)-(o) occur when the different thresholds in FIGS. 10(a)-(d) are exceeded. Fourteen different original density decision threshold values determine the fifteen gradations shown in FIGS. 8(a)-(o).

Figure 11:
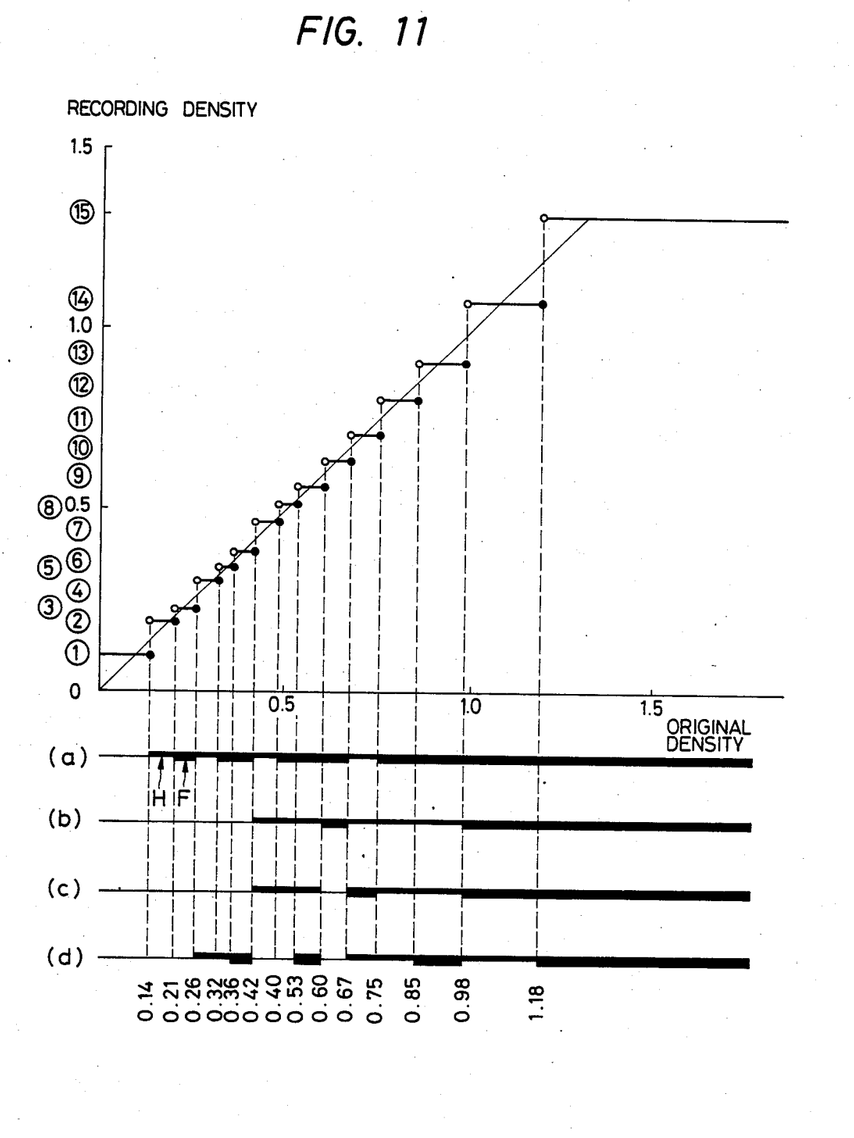

The graphs in FIG. 11 show the relationship between recording densities and original densities for the half-tone expressing unit gradations of FIGS. 8(a)-(o). In FIG. 11, the vertical axis represents recording densities with respect to the half-tone expressing units (1) through (15) corresponding respectively to FIGS. 8(a)-(o), and the horizontal axis represents original densities. FIGS. 11(a)-(d) shows half-tone levels of the four recording picture elements a through d, respectively. In FIGS. 11(a)-(d), a thin line, identified as "H," corresponds to a half dot, and a heavier line, identified as "F," corresponds to a full dot. The drawings in FIGS. 11(a)-(d) correspond to the graphs in FIGS. 10(a)-(d), respectively. The half-tone recording method and apparatus of this invention can express the gradations shown in FIGS. 8(a), 8(g), 8(h), 8(i), 8(l) and 8(m) which the conventional devices do not. This added capability provides a more even and natural expression of half-tones.

In accordance with the present invention, the half-tone level of at least one of the recording picture elements both increases and decreases as the picture signal half-tone level increases, thereby increasing the half-tone expressing unit gradation in multiple steps from white to black. For example, in the half-tone recording method and apparatus according to this invention, all of the four recording picture elements a through d change in this manner while the gradations change. The half-tone level of recording picture element a is 0 until the signal level reaches the original density decision threshold value at 0.14 at which time the level changes between 0.5 and 1, until the signal level exceeds the original density decision threshold value at 0.75 at which point the half-tone level of element a stays at 1. Unlike conventional devices, the half-tone levels of these devices can decrease with increasing gradation thereby allowing additional gradations.

The half-tone level of recording picture element b is 0 until the signal level exceeds the original density decision threshold level at 0.42. Thereafter, that half-tone level is either 0.5 or 1 until the signal level exceeds the original density decision threshold level at 0.98 at which point element b's halftone level becomes fixed at "1." The half-tone levels of recording picture elements c and d change between 0, 0.5, and 1. In the case of recording picture element c, its half-tone level is fixed at 1 when the signal level exceeds an original density decision threshold value at 0.98, and in the case of recording picture element d, its half-tone level is fixed at 1 when the signal level exceeds an original density decision threshold value at 1.180.

Figure 12:
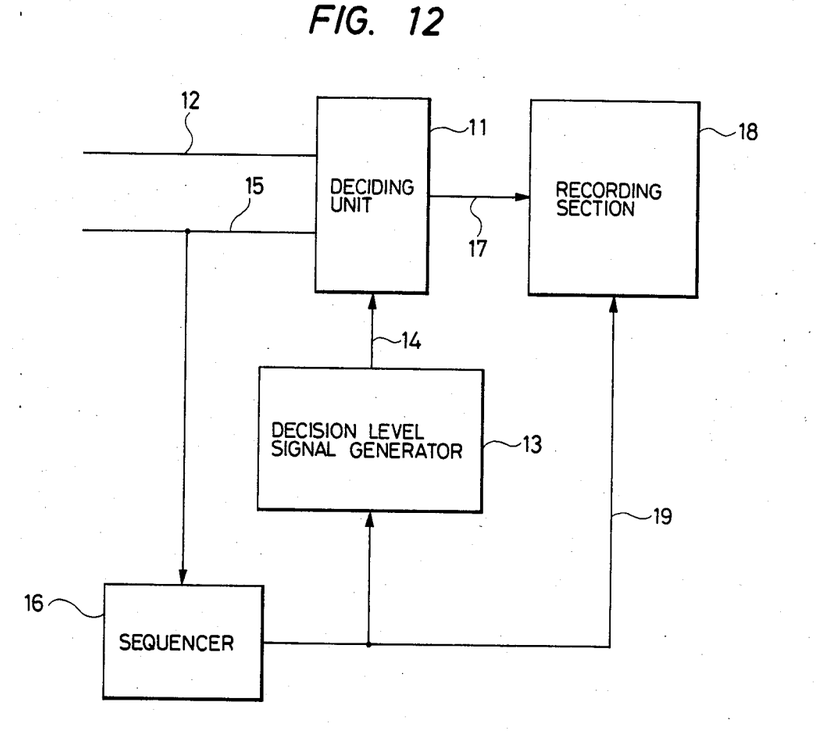
FIG. 12 is a block diagram of a recording device according to a first embodiment of the present invention.

FIG. 12 shows an example of a record device according to this invention which realizes the half-tone recording method described in reference to FIGS. 8–11. The device in FIG. 12 receives analog level picture signal 12 corresponding to the brightness of an original document. Signal 12 feeds deciding unit 11 which ternary-encodes picture signal 12 using decision level signal 14 from decision level signal generator 13. Generator 13 varies decision level signal 14 according to the recording picture element (i.e., FIGS. 7(a)–(d)) in the half-tone expressing unit that corresponds to the current portion of picture signal 12 supplied to the deciding unit 11. Sequencer 16 controls the variation of signal 14 according to synchronizing signal 15 which is in synchronization with picture signal 12. For example, when a portion of picture signal 12 corresponding to recording picture element a is supplied to deciding unit 11, sequencer 16 causes decision level signal generator 13 to produce a decision level signal 14a which is ternary-coded data as shown in FIG. 10(a).

Deciding unit 11 determines the half-tone level of the picture signal 12 according to the fourteen (14) original density decision threshold levels by determining the half-tone levels of the recording picture elements a–d. For example, for picture element a, if the picture signal 12 represents an original density of 0.5, then the half-tone level of recording picture element a is 1; if signal 12 represents an original density of 0.7, then the half-tone level of recording picture element a is 0.5; if picture signal 12 represents a original density of 0.1, then the half-tone level of recording picture element a is 0. The half-tone levels form ternary-encoded picture signal 17.

Ternary-encoded picture signal 17, in synchronization with the synchronizing signal 15, represents a series of full dots, half dots and non-printing or white dots. Signal 17 is applied to recording section 18. The half-tone levels 1, 0.5 and 0 correspond to the full dot, the half dot, and the non-printing dot, respectively. Preferably, recording section 18 comprises a thermal transfer type recording device and stores ternary-encoded picture signal 17 line-by-line into a line buffer (not shown) according to a control signal 19 from sequencer 16. Then, first printing data derived from the stored signal are set into a shift register (not shown) in recording section 18 and used to operate a thermal head (not shown). The first printing data are such that among the pictures signals 17 written into the line buffer, those portions corresponding to the half dot and the full dot are set to 1, and those corresponding to the non-printing dot are set to 0. When the thermal head operates, heat generating elements corresponding to the signals with a value 1 generate heat to fluidize or sublimate thermal transfer type ink. As a result, the ink is transferred onto the recording sheet (not shown) thus printing half dots.

Next, second printing data are set into the shift register and the thermal head is operated. Auxiliary scanning of the recording sheet does not occur until printing is performed according to the second printing data. The second printing data is such that only the portions of picture signal 17 in the line buffer that correspond to the full dots are set to 1 and the remaining portions are set to 0. When the thermal head is then operated, heat generating elements corresponding to the full dots are driven to generate additional heat so that the corresponding recording picture elements are expressed as full dots.

After each line has been printed, the recording sheet moves to the next recording position by auxiliary scanning, and section 18 continues to carry out the recording operation as described above.

Second Embodiment

Figure 13:
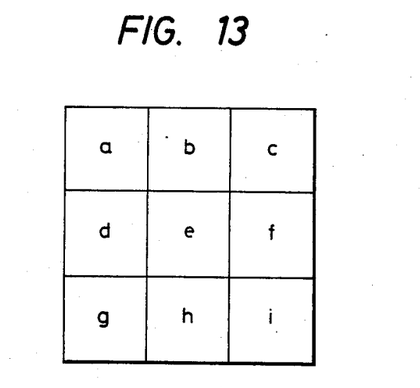
FIG. 13 is a diagram of recording picture elements in a half-tone expressing unit used in a second embodiment of this invention.
Figure 14:
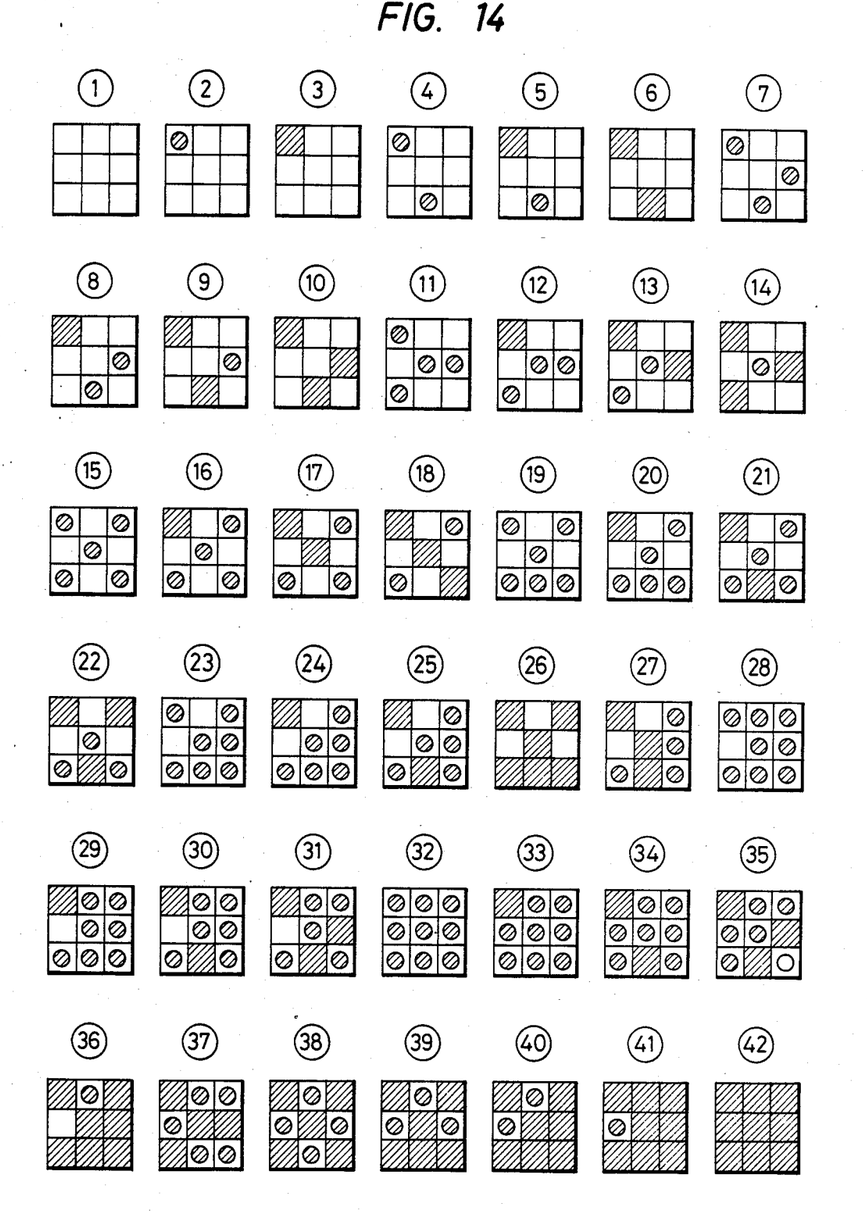
FIG. 14 shows the forty-two (42) gradations expressed by half-tone expressing units in a second embodiment of this invention.

In a second embodiment of the half-tone recording method and apparatus of this invention, the half-tone expressing unit contains nine (9) recording picture elements a through i arranged in a 3×3 matrix, as shown in FIG. 13. Theoretically, fifty-five (55) gradations can be expressed by using the half-tone expressing unit. If the sizes of the full dot and the half dot are determined as shown in FIG. 9, however, some of the fifty-five gradations are very similar to one another and can be omitted. FIG. 14 shows the forty-two (42) different half-tone expressing units obtained by omitting the similar gradations.

Figure 15:
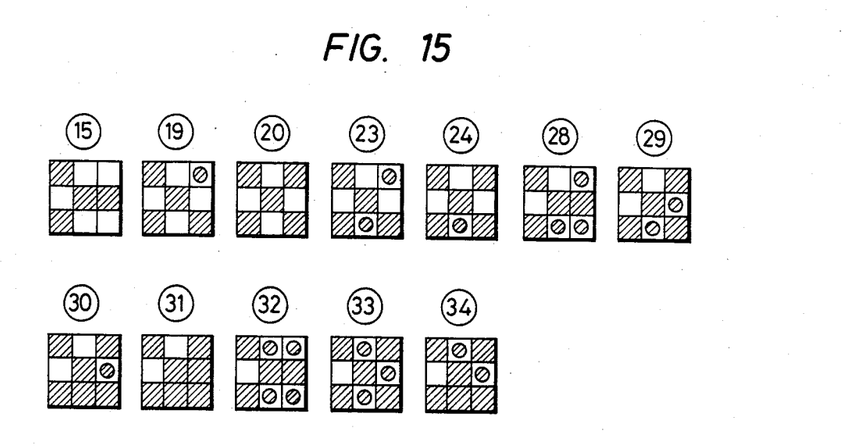
FIG. 15 shows different gradation patterns which the half-tone expressing unit can take according to a second embodiment of this invention.
Figure 16:
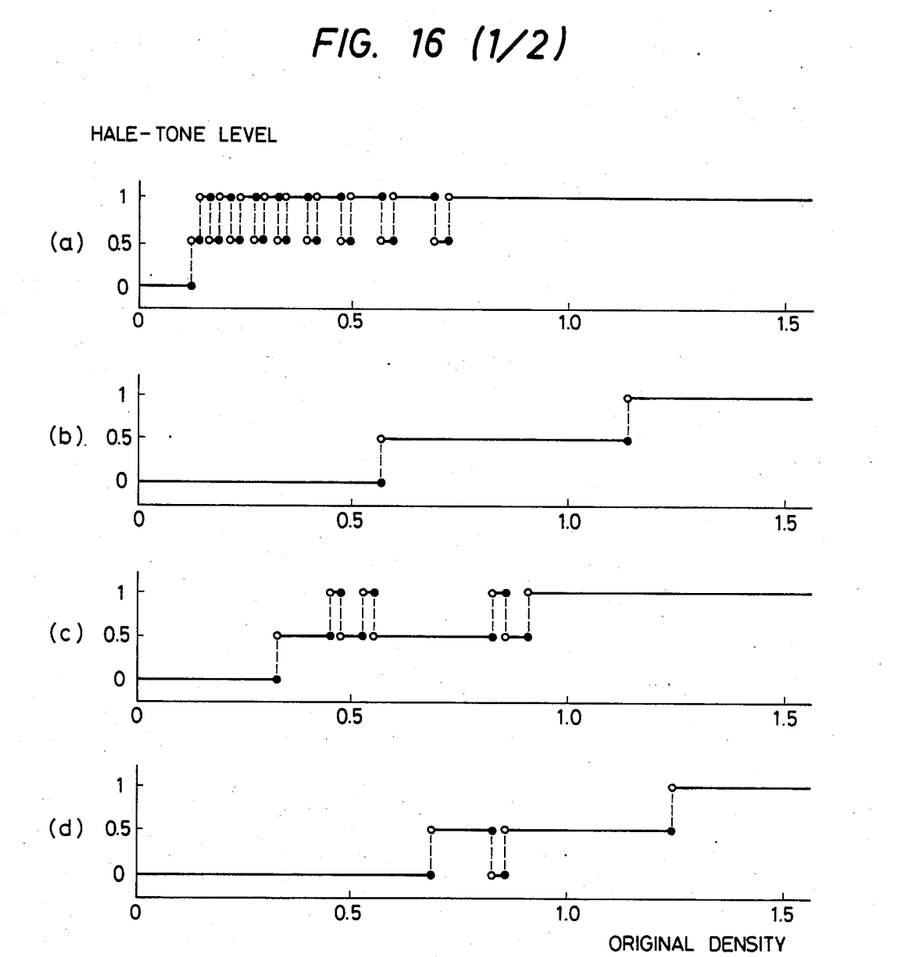

FIG. 15 shows another example of the half-tone expressing units in which the patterns of the half-tone expressing units (15), (19), (20), (23), (24), and (28) through (34) in FIG. 14 are replaced by other patterns, the remaining patterns staying the same.

The graphs in FIGS. 16(a)–(i) indicate the half-tone levels of the recording picture elements a through i, respectively, for obtaining the forty-two gradations shown in FIG. 14. For each recording picture element a and c through i, the half-tone level is initially 0, then both increases and decreases according to the ranges determined by threshold values, and finally is fixed at 1. The half-tone level of recording picture element b increases stepwise, and is finally fixed at 1.

Theoretically, a recording device for practicing the second embodiment may be the same as the recording device in FIG. 12. In the second embodiment, however, units of half-tones are expressed by three lines (rasters) and there are forty-one (41) original density decision threshold values. Therefore, such a recording device is somewhat intricate.

According to this invention, half-tones can be recorded with relatively few recording picture elements using the digital recording operation described. Pictures recorded according to this invention have excellent preservability, and the half-tones can be reproduced with high stability.

What is claimed is:

1. A method of recording a picture by a pattern of dots representing half-tone density images derived from a picture signal representing the picture, the method comprising the steps of:

(a) assigning different picture elements to represent different portions of said picture signal, each picture element being capable of assuming one of first, second, and third half-tone levels corresponding to no dot, a partial dot or a full dot wherein a partial dot is smaller in area than a full dot and larger than half of the area of a full dot;

(b) grouping said picture elements into a plurality of different half-tone expressing units, each of said expressing units including a first number of different picture elements and corresponding to an area of the picture comprising of the portions of the picture signal represented by said picture elements included in said expressing unit;

(c) determining which of a second number of half-tone gradations corresponds to each expressing unit by analyzing said picture signal, each said gradation corresspponding to a different half-tone gradation within a range of half-tone densities from white to black and each of said second number of half tone gradations being represented by a unique combination of picture element half-tone levels such that the half-tone level of each of said picture element half-tone levels may both increase and decrease with an increase in said half-tone gradations within said range; and (d) recording, for each said determined gradation, the half-tone levels for the picture elements in said corresponding half-tone expressing unit by not printing a dot to represent said first half-tone level or by printing a partial dot or full dot to represent said second and third half-tone levels, respectively.

2. The method of claim 1, wherein said determining step includes the steps of:

measuring the picture density of the picture signal portions corresponding to each said picture element; and comparing each said measured density to a number of threshold values.

3. An apparatus for recording half-tone densities from a picture signal representing picture data wherein different picture elements correspond to different portions of said picture signal, said apparatus comprising:

means for selecting one of a first, second, or third selecting half-tone levels for each said picture element by comparing said picture element to first and second predetermined theresholds, such that said half-tone levels for a first number of picture elements in a half-tone expressing unit uniquely express the half-tone density of the picture signal corresponding to. said second number of picture elements and wherein the half-tone value of at least one of said first number of picture elements both increase and decreases as said half-tone density increases;

means for generating said first and second predetermined thresholds;

means for synchronizing said selecting means and said threshold generating means; and means for printing an image of the picture signal by printing a dot image corresponding to each half-tone expressing unit by recording a partial dot for each picture element having said second half-tone level, a full dot for each picture element having said third half-tone level and inhibiting the recording of a dot for each picture element having said first half-tone level, each said partial dot recorded having an area smaller than the area of a full dot but greater than one-half the area of a full dot.

* * * * *